(12) United States Patent
Sedky et al.

(10) Patent No.: US 6,904,452 B2
(45) Date of Patent: Jun. 7, 2005

(54) SYSTEM AND METHOD FOR DISTRIBUTED IMAGING

(75) Inventors: Khaled Salah Sedky, Bothell, WA (US); Amanda Giang-Tien Nguyen, Bothell, WA (US); Albert L. Ting, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 10/001,400

(22) Filed: Oct. 31, 2001

(65) Prior Publication Data

US 2003/0084153 A1 May 1, 2003

(51) Int. Cl.[7] .............................................. G06F 15/16
(52) U.S. Cl. .................... 709/203; 709/226; 709/224
(58) Field of Search ................. 709/203, 223, 709/224, 226, 238; 707/100; 710/15, 17; 358/1.11; 714/4

(56) References Cited

U.S. PATENT DOCUMENTS 5,220,674 A * 6/1993 Morgan et al. ............. 709/223
6,216,159 B1 * 4/2001 Chintakrindi et al. ....... 709/220

* cited by examiner

*Primary Examiner*—Mehmet B. Geckil
(74) *Attorney, Agent, or Firm*—Shook, Hardy & Bacon, L.L.P.

(57) ABSTRACT

The present invention is a system and method for providing distributed seamless, fault tolerant and reliable solutions for imaging devices through creating virtual imaging servers and virtual connections to network imaging devices. This invention provides imaging job routing, job balancing, continuous service availability, simplified imaging device administration and the transparency of imaging device locations and name on a network by employing a hierarchical schema which defines and describes imaging devices, servers and imaging jobs.

21 Claims, 3 Drawing Sheets

SYSTEM AND METHOD FOR DISTRIBUTED IMAGING

CROSS REFERENCE TO RELATED APPLICATIONS

Not applicable.

FIELD OF THE INVENTION

The present invention relates to computing network environments. More specifically, this invention relates to a system and method for a distributed seamless and reliable solution that decouples network imaging devices from a single server through creating virtual imaging servers and virtual imaging connections.

BACKGROUND OF THE INVENTION

The sharing of imaging devices across computer networks is a common arrangement. Network imaging devices by way of example and not limitation, include network printers, network scanners, network faxes and other such network devices for conveying electronic information between a computing system and a user. Although this discussion will focus on printers and the printing infrastructure, the same information is applicable to other network imaging devices.

Printers are usually very tightly coupled with an individual PC or server and thereby tend to create delays and unavailability problems for users, particularly in situations where the server is down or overloaded, or where the printer is malfunctioning. The tight coupling of printers also necessitate extensive reconfiguration of a PC when there is a need to change print servers or printers. Furthermore, it is not uncommon within current printing schemes that a particular printer will become overloaded thus delaying print jobs, while another printer remains idle.

Current methods employed to overcome some of the problems discussed above include providing standby printers that only serve the purpose of being available as a swap-in in the event the active printer should fail. This same method is also employed with print servers. In other words, an identical piece of computing hardware is configured and placed on standby ready to be swapped in as needed. Apart from the obvious issue of the cost involved in equipment duplication, there are several other problems with this approach. For example, in the case of a standby server, logistical problems and extra work are created particularly from an administrative standpoint, because it is necessary to ensure that any changes, upgrades or reconfigurations that are applied to the functional server are also applied to the standby server. Another problem that arises from equipment duplication is the under-utilization of physical resources; a phenomenon that stems from having equipment that is just sitting around. Yet another problem is related to the loss of transient data information that occurs when switching out physical equipment. For instance, current print jobs or fax requests of particular documents that have been loaded onto a server are lost when that equipment is substituted with another one. In other words, the swapping of equipment does not provide any means for salvaging any imaging jobs that have been sent to the server at the time of the equipment failure or equipment unavailability. This should not be confused with fault tolerance with respect to jobs. If a job is in the middle of printing that job cannot be recovered.

Accordingly, there exists a need for providing a distributed environment in which printing and other imaging services are more efficient and reliable. The present invention provides a system that relieves the user from the tasks of searching for network printers and/or manually moving jobs to available print queues. There also exists a need to provide a system with fail-over, built in monitoring and load balancing capabilities that ensure that printing services are always available. Furthermore, there exists a need to simplify the administration of network printing devices and print servers. There is also a further need to provide location and name transparency of network printer servers, from the end users perspective.

SUMMARY OF THE INVENTION

The present invention is directed to a method and system for distributed imaging in a network environment. The invention provides fault tolerance and high availability of imaging devices, through the decoupling of network imaging devices from network servers. The decoupling incorporates storing information that is common between all network imaging related equipment in an organization and monitoring the health of network imaging devices. The integrity of imaging sessions within this environment is maintained through data replication and other methods of constant interaction between imaging servers and devices. As a result of the aforementioned attributes and features, the present invention provides location and name transparency of imaging devices as well as ease of administering these devices in a network environment.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention is a system and method for providing distributed seamless, fault tolerant and reliable solutions for imaging devices through creating virtual imaging servers and virtual connections to network imaging devices. This invention is directed to network connected imaging devices and not standalone devices. The particular embodiments described herein are intended in all respects to be illustrative rather than restrictive. Alternate embodiments will become apparent to those skilled in the art to which the present invention pertains without departing from its scope.

Figure 1:
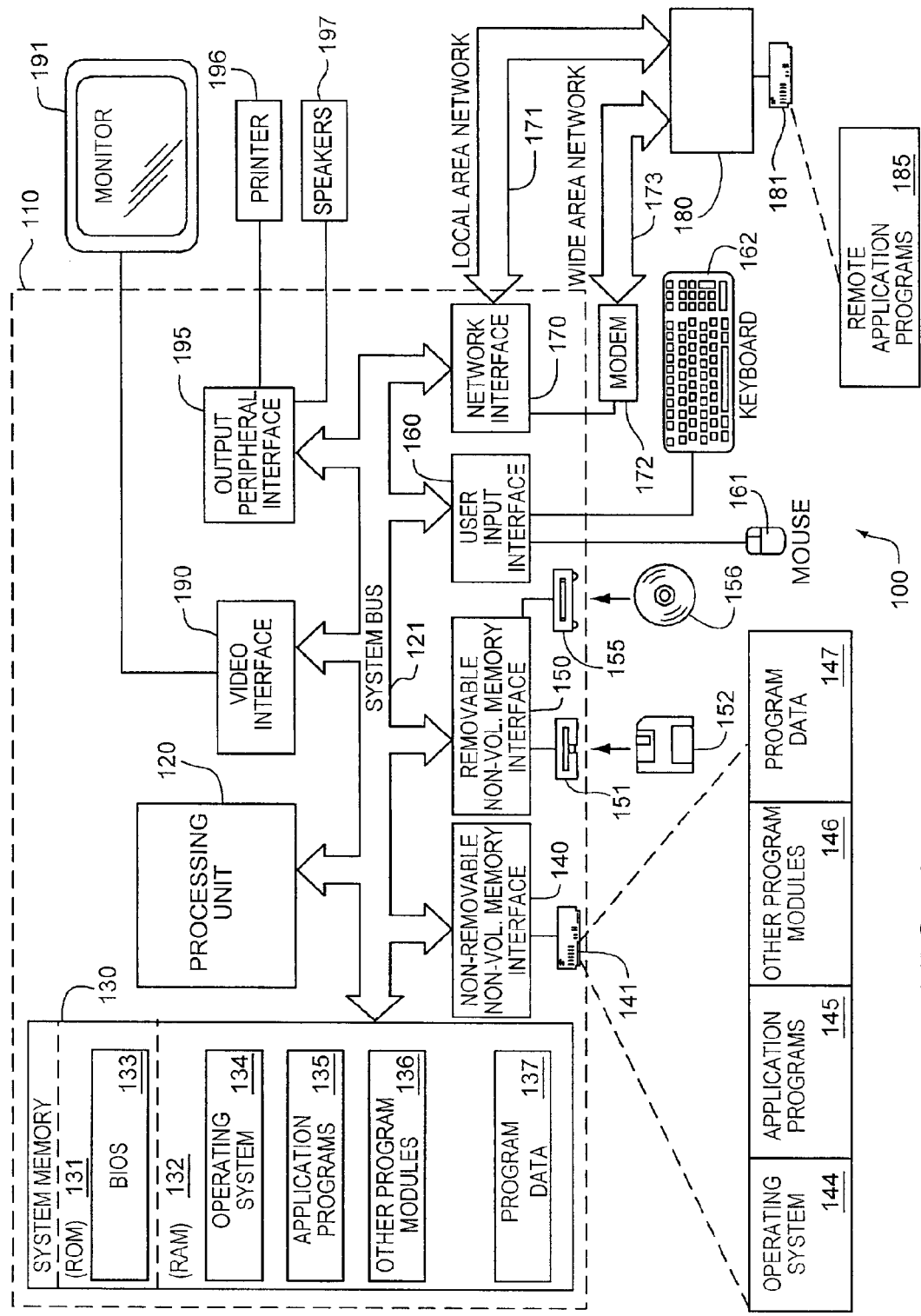
FIG. 1 is a block diagram of a suitable computing system environment for use in implementing the present invention.

FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system implementing the invention includes a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

Figure 2:
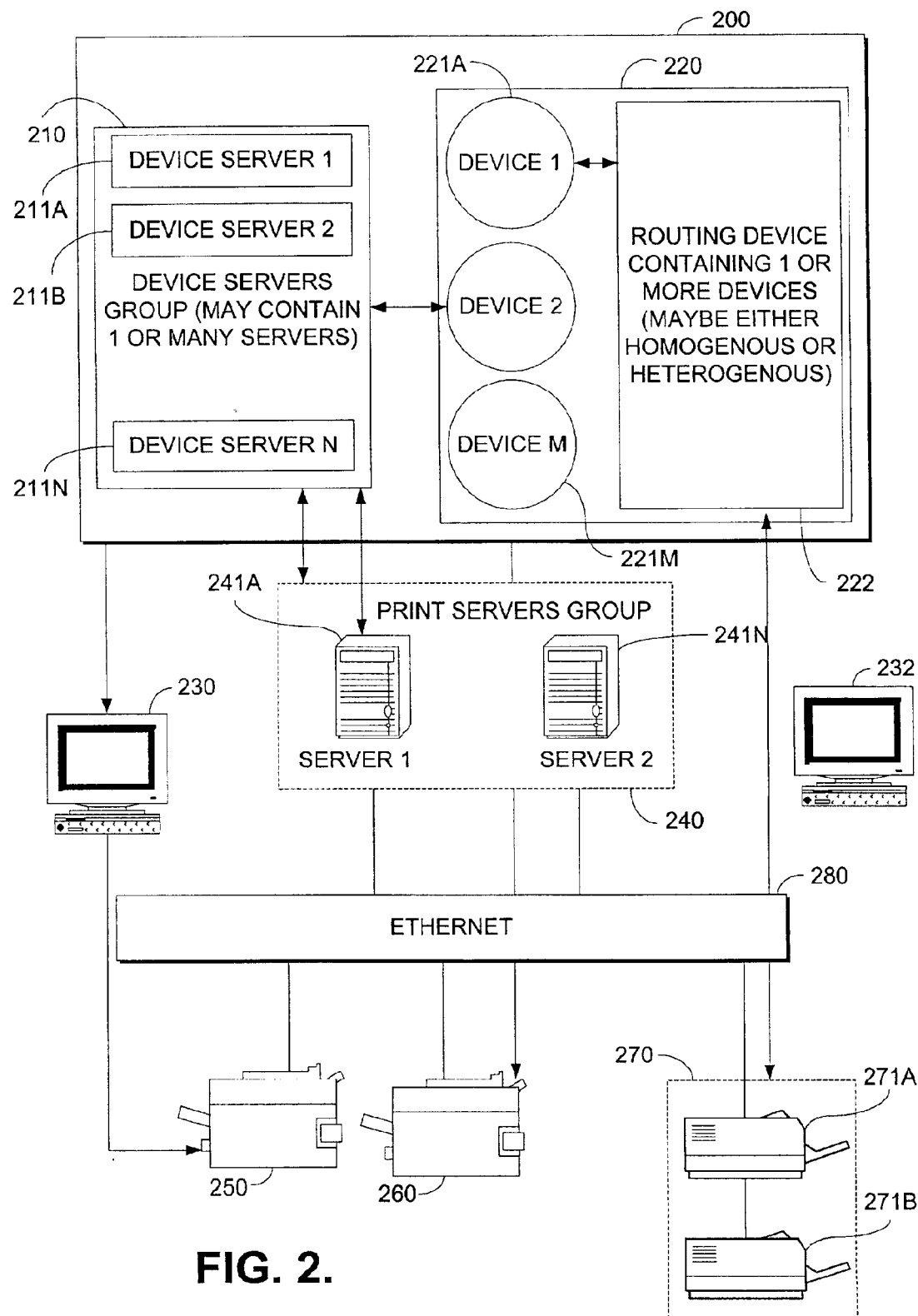
FIG. 2 is a block diagram illustrating the mapping between objects defined within a backend store and physical network devices.

In FIG. 2, an exemplary illustration of an architecture and a mapping between an information store 200 and physical devices for practicing the present invention is shown. In an embodiment of the present invention, a central information store 200 otherwise referred to as a back-end store such as Active Directory or a database engine is used to implement a schema. Within the information store 200, several attributes, properties and information relating to physical objects are maintained and categorized. In other words, a schema of servers, imaging services and imaging devices are defined for a network. The schema includes a device server Group 210 (DSG), multiple device servers (211A to 211N generally identified as 211), an Imaging Devices Group 220 (IDG), multiple imaging devices 221A to 221M generally identified as virtual devices 221, and a routing device 222. The DSG 210 is identified and defined within the schema as a collection of one or more device servers 211. DSG 210 is the virtual representation of a collection of physical print servers 240, and it is defined to serve numerous physical printers. There is a one-to-one relationship between the schema based DSG 210 and a physical group of print servers 240. Furthermore, for each schema defined device server 211, there is a corresponding physical print server (241A to 241N, generally identified as 241).

The IDG 200 is also identified and defined within the schema as a collection of one or more virtual devices 221 and a routing devices 222, if applicable. A virtual device 221 represents a single physical network imaging device such as network printer 250,260. The virtual device 221 is the target network object for an end-user's imaging request, in other words, jobs are directed to a virtual device rather than a physical device. This causes the logic of the system of the present invention to determine the applicable DSG 210, device server 211, and ultimately the physical print server 241 and physical network printer 250,260 that will process the job. A routing device 222 is a schema representation of one or more homogenous or heterogeneous network imaging devices that are located in close physical proximity to one another. For example, the illustrated grouping of network printers 270 would be a basis for a routing device 222. This is because the first printer 271A is located physically close to the second printer 271B and both printers are the same make and model or are at least interchangeable for one another. A routing device 222 is associated with a single virtual device 221, as such an end-user's job would be directed to a virtual device 221. However, since a routing device 222 may be associated with multiple physical Network printers 271A, 271B, the job that was directed to the virtual device 221, which is in turn associated with the routing device 222 can be serviced by either one of the physical Network printers 271A, 271B. Thus, a routing device 222 represents multiple physical network printers 271A, 271B that are treated as a single device from the end-users perspective. To recap, it should be understood that printing and other imaging jobs are generated at a client 230 and directed to a virtual device 221, which is a physical representation of a single network imaging device 250, 260 or one of a grouping of network printers 271A, 271B.

Turning now to the interaction of the device server 211 and the virtual device 221. Each and every virtual device 221 is associated with at least one DSG 210, which as previously discussed may contain one ore more device servers 211. Implicitly, each virtual device 221, which could be serviced by any of the device servers 211 within the DSG 210, is serviced by only one device server 211 at a given point in time. For example, in the physical realm of a network, every printer on a network is associated and identified with a particular print server group 240. Conversely, the print server group can be associated and identified with several network printers 250,260, however, each network printer 250,260 is associated with only one print server 241 at a time.

Turning next in detail to the physical network objects i.e. network printers, print servers and client systems. As shown in FIG. 2, there are two or more print servers (241A to 241N generally referred to as 241) and multiple network printers 250, 260, 271A and 271B, through which one or more client's print requests can be fulfilled. As previously discussed, the group of print servers, Print server group 240 is associated with a DSG 210 within the information store 200 in a 1-to-1 relationship. Furthermore, each print server 241 is also associated in a 1-to-1 relationship with a device server 211 that is defined within the information store 200. As such, within the information store 200 schema, there are as many device servers 211 as there are physical print servers 241. With regards to the physical network printers 250, 260 there is a 1-to-1 relationship with those virtual devices 221 that are not related to a Routing Device 222, within the Information store 200. For example, device 221M has a 1-to-1 relationship with network printer 260 and device 221B has a 1-to-1 relationship with network printer 250. However, device 221A does not have a 1-to-1 relationship with any particular printer, but is instead related to multiple printers 271A, 271B.

When there is a routing device 222 defined within the schema, there is a corresponding grouping of network printers 270. This grouping consists of identical or interchangeable network printers 271A, 271B that are located in close proximity to one another. The Network Printer Group 270 has a 1-to-1 relationship with a routing device 222 that is defined within the information store 200. The routing device 222 in turn has a 1-to-1 relationship with a virtual device 221, also defined within the information store 200. In other words, there is an implicit 1-to-1 relationship between a virtual device 221 and network printer group 270. This unique arrangement allows multiple physical Network printers 271A, 271B to be able to respond to print requests that were destined for one virtual device 221A. In other words, the two printers 271A and 271B are seen as one printer by a network client, as such jobs can be transparently switched between the printers. Alternative embodiments of the present invention will become apparent to those skilled in the art to which it pertains.

Figure 3:
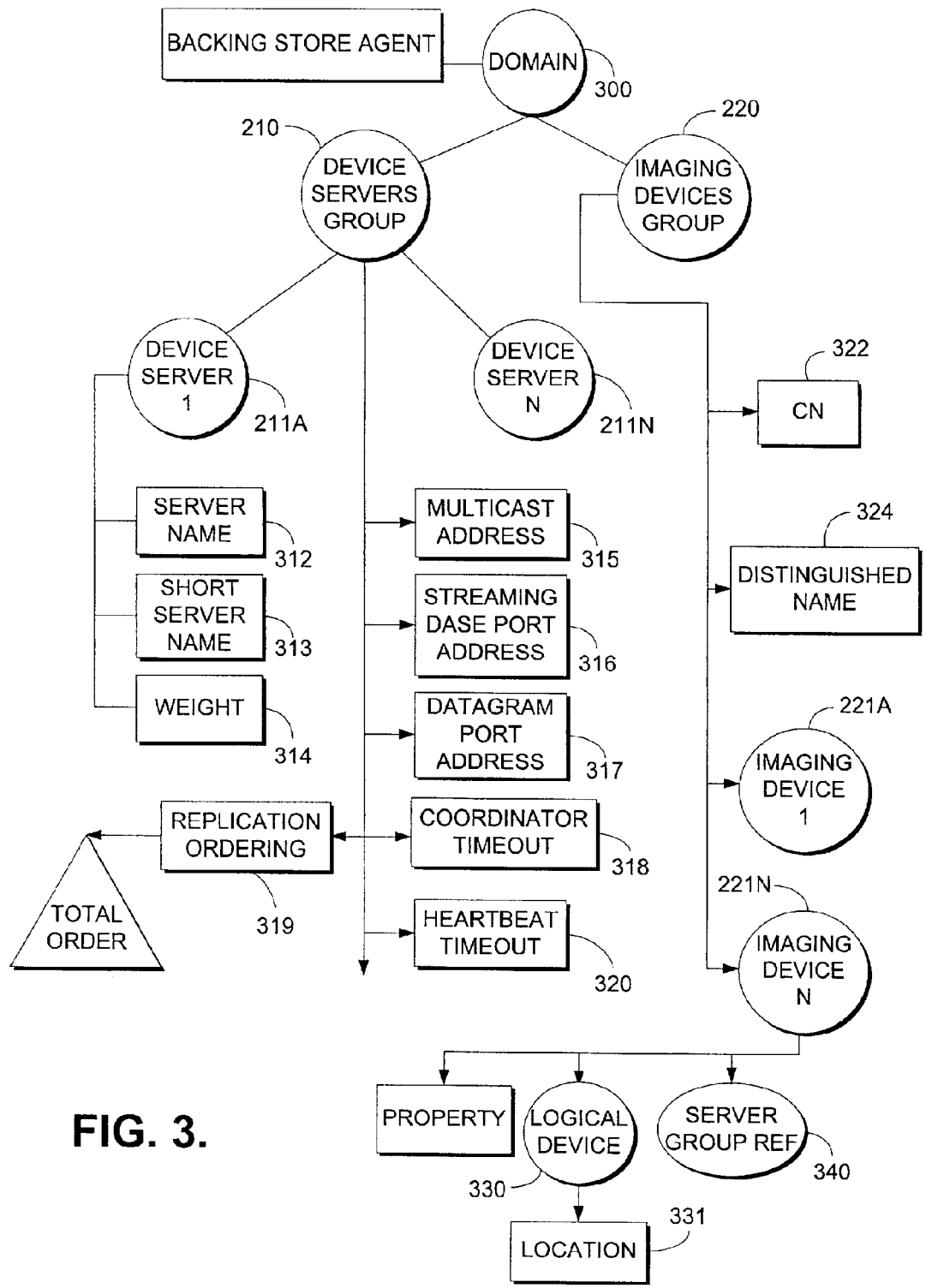
FIG. 3 is a diagram illustrating a schema within a backend store.

For each of the information store 200 schema objects discussed above, there are various types and levels of information that define an object type within the schema. FIG. 3 is an exemplary illustration of a hierarchical schema for practicing the present invention. As previously stated, this illustration addresses distributed printing, however the concepts and application are extendable to other network imaging devices. The top level of this hierarchy is the domain container 300, which is the object with which back-end store agents or other client components communicate. Within a given network domain, there is a device servers Group (DSG) 210 and an Imaging Device group (IDG) 220. The concept of the domain is synonymous to the information store 200 discussed earlier with respect to FIG. 2. Returning to FIG. 3, the schema for DSG 210 includes information pertaining to multiple device servers 211A–211N, and information that defines and describes the group of servers. The schema for a DSG 210 can include objects such as, a multicast address 315, a streaming base port address 316, a datagram port address 317 and other such information as necessitated by the protocol of the utilized network or environment.

In an embodiment of the present invention, the high availability of print servers is achieved by providing the ability for the print servers within a print server group to discover other members of the same group, and to communicate and coordinate with other members without causing contentions or discrepancies of networked shared resources. This feature is facilitated by the protocol related schema objects, which will be described below.

Additional information such as Coordinator Timeout 318, Heartbeat Timeout 319, and Replication Ordering 319, are variables that are defined for the implementation of other features of the present invention and may also be defined and stored within the schema of a DSG 210. For instance, Heartbeat Timeout 319 is used by a feature within an embodiment of the invention, which allows each print server to monitor the health of other print servers within the group. Coordination Timeout 318 is used for the process of coordinating the access to shared resources within this distributed system. Replication Ordering 319 facilitates the replication of information about the relationship between servers and printers, across all print servers in the group. This provides a reliable fail-over mechanism that induces high availability and fault tolerance within the system.

For each device server 211 various other attributes and information are stored within the schema including server name 312, short server name 313 and an associated weight 314 for that server. The associated weight value given to a particular device server 211 can be dynamically allocated or statically assigned. In either case, the effect of the weighting is to identify a master and enumerate the order in which the device servers 211 will be elected as the new master in the event of a master failure. An election algorithm is implemented to select or re-elect a master when either a device server is started or when the election process is initiated by a device server. It should be noted that other attributes and values pertaining to the server can also be included within the schema. An illustrative hierarchy for a schema of the present invention along with a description of some of the constituent elements is shown in the following table:

| Schema Hierarchy | Data Type | Description |
| --- | --- | --- |
| DeviceServerGroup | Class | Container of all print servers |
| MultiCastAddress | String | Each group will have a multicast address used by the replication agent |
| StreamingBasePortAddress | Int | For communication between PSDA we need a base Port Address which according to participant weights could give the PSDA a port number to use for communication |
| DataGramPortAddress | Int | Port Number used for multicasting |
| CoordinatorTimeOut | Int | Time out after which a new election starts |
| HeartBeatTimeOut | Int | Time Interval to wait, between Heart Beat messages |
| NumOfLivenessRetries | Int | How many times to retry before considering a node dead |
| ReplicationOrdering | String | {Total , Casual, . . .} |
| Description | String | A string describing this instance (Group) |
| Name | String | The name given to this group |
| DeviceServer | Class | Print Server representation |
| Name | String | Name of Server (Display) |
| Weight | Int | Weight given to server |
| ShortName | String | This is the NT4 name like NTDEV |
| LongNetworkName | String | This is the DNS name like ntdev.Microsoft.com |
| Imaging Devices Group | Class | Container for Imaging Devices |
| Name | String | The name given for the group |
| Description | String | A string describing this instance (Group) |
| Imaging Device | Class | Printer Representation |
| Logical Device | Object Ref | A reference to a Logical Device |
| Device Container | Object Ref | A reference to the Devices Group handling this Device |

With regards to the schema representation of imaging devices there is an Imaging Devices Group (IDG) 220. The IDG 220 is defined and described by a distinguished name 324 element, a count 322 of the number of devices within the group and multiple imaging devices (221A to 221N generally referred to as 221). For each imaging device 221, there are schema entries and associated values for each of the specific attributes and properties of the device, along with values that relate to those attributes and properties. For example, the schema entries include a virtual device 330 entry and a server group reference 340 entry. A schema entry of a location 331 associated with the virtual device 330, is one of the many possibilities of attributes and property value pairs, that can be found for an imaging device 221. As would be understood by those skilled in the art to which the present invention applies, a variety of schema entries and associated values may well be incorporated, and are with the scope of this invention.

In an embodiment of the present invention there is a load balancing of print jobs. The load balancing is a heuristic dynamic process that can be implemented at multiple levels. In one instance, there is load balancing among the device servers of job queues destined for printers or other devices. For example, if there are two print servers and six queues, the system of the present invention could cause each print server to handle three queues or more, regardless of how or when jobs are submitted to the six queues. In another instance, there is load balancing of jobs among print servers. For example if there are two print servers and four queues, the queues would be dynamically shuffled between the two print servers on a job by job basis, thus ensuring that none of the print servers is heavily loaded. Furthermore, there are mechanisms in place to direct new print requests to unloaded queues so as to prevent the possibility of everyone printing to the same queue at all times. In yet another instance, the concept of a pooling device that groups many physical printers allows the distribution of jobs among the pooled printers according to the load on each printer. An even further aspect of the present invention provides a means for collecting and sharing information on submitted print jobs which allows the various forms of load balancing discussed above to operate without a resulting loss of print job information.

As discussed above, the method and system of the present invention offers many novel and beneficial features to distributed network imaging, particularly the decoupling of imaging devices from imaging servers. In addition, the ease of administering network imaging devices, the discovery of imaging servers and the automatic fail-over switching of devices are but few of the other immediate benefits of the present invention, to organizations that have to contend with a vast amount of network users and equipment. It should be noted that the fail-over can be manually configured in addition to having the system fail to the 'best' server. From the end-users perspective, the present invention also provides improved performance, consistent generation of images and provides notification and logging of problems related to image generation. Furthermore, the present invention provides a very extensible system and method that are applicable to solve similar types of problems in a networked environment.

Alternative embodiments of the present invention will become apparent to those skilled in the art to which it pertains upon review of the specification, including the drawing figures. The various systems and methods showing in FIGS. 1–3 and described in the specification are merely exemplary of those suitable for use in connection with the present invention. Accordingly, the scope of the present invention is defined by the appended claims rather than the foregoing description.

We claim:

1. A method for use in a networked computing environment for providing imaging services in response to a request for an imaging job, comprising:

providing an information store, said information store comprising (1) one or more virtual device server groups, each comprising one or more virtual device servers, and (2) one or more virtual imaging device groups, each comprising one or more virtual imaging devices, each of said virtual device server groups being associated with a physical imaging server group comprising one or more physical imaging servers, each of said virtual device servers in a virtual device server group being associated with a physical imaging server of a corresponding physical imaging server group, each of said virtual imaging device being associated with one or more physical imaging device; and allocating said imaging job to one of said virtual imaging devices and one of said virtual device servers for processing at one of said physical imaging devices.

2. A method as recited in claim 1 wherein said virtual imaging device group includes one or more routing devices.

3. A method as recited in claim 1 further comprising monitoring the health of said physical imaging servers.

4. A method as recited in claim 3, wherein said monitoring is accomplished by enabling constant interaction between multiple physical imaging servers.

5. A method as recited in claim 1 further comprising load balancing between two or more physical imaging servers.

6. A method as recited in claim 1 further comprising automatic detection and configuration of physical imaging servers.

7. A method as recited in claim 1 further comprising replicating information between two or more physical imaging servers.

8. A method as recited in claim 1 further comprising load balancing between two or more network imaging devices.

9. A method as recited in claim 1 wherein said network imaging device is a network printer.

10. A method as recited in claim 1 wherein said network imaging device is a network fax.

11. A method as recited in claim 1 wherein said network imaging device is a network scanner.

12. A method for use in a networked computing environment for fault tolerance and high availability printing comprising:

providing a hierarchical schema representation of physical network components for the processing of requested print jobs, wherein said schema representation provides transparency of printer names and locations;

managing print jobs across one or more print servers; and managing the routing of print jobs to one or more network printers.

13. A method as recited in claim 12, wherein said managing across said print servers includes preserving the integrity of print jobs as print jobs are switched between said print servers.

14. A method as recited in claim 12, wherein said managing across said print servers includes preserving the integrity of print jobs as print jobs are routed from a first network printer to a second network printer.

15. A method as recited in claim 12 further comprising load balancing of print queues among said print servers.

16. A method as recited in claim 12 further comprising load balancing of printing among said network printers.

17. A method for use in a networked computing environment for imaging on one or more physical imaging devices wherein the physical imaging devices are de-coupled from one or more physical imaging servers to enhance the availability of imaging devices, comprising:

providing an information store, said information store comprising (1) one or more virtual device servers, and (2) one or more virtual imaging devices, each of said virtual device servers being associated with a physical imaging server, each of said virtual device servers being associated with one or more virtual imaging devices, each of said virtual imaging device being associated with one or more physical imaging device;

detecting the presence of said one or more physical imaging servers on said network and enabling fail-over between a first physical imaging server and a second physical imaging server; and managing and balancing imaging distribution between said physical imaging servers and said physical imaging devices.

18. A computer readable medium having computer executable instructions for performing a method for use in a networked computing environment for providing imaging services comprising:

providing an information store, said information store comprising (1) one or more virtual device server groups, each comprising one or more virtual device servers, and (2) one or more virtual imaging device groups, each comprising one or more virtual imaging devices, each of said virtual device server groups being associated with a physical imaging server group comprising one or more physical imaging servers, each of said virtual device servers in a device server group being associated with a physical imaging server of a corresponding physical imaging server group, each of said virtual imaging device being associated with one or more physical imaging device; and providing a central file share, said file share including imaging job queues and imaging job assignments; and allocating said imaging job queues from said central file share to one of said virtual device servers and one of said virtual imaging devices for processing at one of said physical imaging devices.

19. A computer system having a processor, a memory and an operating environment, the computer system operable to execute a method for use in a networked computing environment for providing imaging services comprising:

providing an information store, said information store comprising (1) one or more virtual device server groups, each comprising one or more virtual device servers, and (2) one or more virtual imaging device groups, each comprising one or more virtual imaging devices, each of said virtual device server groups being associated with a physical imaging server group comprising one or more physical imaging servers, each of said virtual device servers in a virtual device server group being associated with a physical imaging server of a corresponding physical imaging server group, each of said virtual imaging device being associated with one or more physical imaging device; and providing a central file share, said file share including imaging job queues and imaging job assignments; and allocating said imaging job queues from said central file share to said virtual devices.

20. A computer readable medium having computer executable instructions for performing a method for use in a networked computing environment for fault tolerance and high availability printing comprising:

providing a hierarchical schema representation of physical network components for the processing of requested print jobs, wherein said schema representation provides transparency of printer names and locations;

each of said print jobs being managed across one or more print servers; and each of said print jobs being routed to one or more network printers.

21. A computer system having a processor, a memory and an operating environment, the computer system operable to execute a method for use in fault tolerance and high availability printing comprising:

providing a hierarchical schema representation of physical network components for the processing of requested print jobs, wherein said schema representation provides transparency of printer names and locations;

each of said print jobs being managed across one or more print servers; and each of said print jobs being routed to one or more network printers.

* * * * *